(12) United States Patent
Shaikh et al.

(10) Patent No.: US 10,024,364 B2
(45) Date of Patent: Jul. 17, 2018

(54) INTEGRATED PLASTIC SHIELD BEARING ASSEMBLY

(71) Applicant: Schaeffler Technologies AG & Co. KG, Herzogenaurach (DE)

(72) Inventors: Shakeel Shaikh, Windsor (CA); Marc Vachon, Troy, MI (US); Bogyu Kang, Rochester Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/131,382

(22) Filed: Apr. 18, 2016

(65) Prior Publication Data

US 2017/0198754 A1 Jul. 13, 2017

Related U.S. Application Data

(60) Provisional application No. 62/277,685, filed on Jan. 12, 2016.

(51) Int. Cl.
*F16C 33/78* (2006.01)
*F16C 19/06* (2006.01)
*F16C 33/80* (2006.01)

(52) U.S. Cl.
CPC ............ *F16C 33/783* (2013.01); *F16C 19/06* (2013.01); *F16C 33/7833* (2013.01); *F16C 33/7846* (2013.01); *F16C 33/7869* (2013.01); *F16C 33/7889* (2013.01); *F16C 33/805* (2013.01); *F16C 2208/12* (2013.01)

(58) Field of Classification Search
CPC .... F16C 19/06; F16C 33/783; F16C 33/7823; F16C 33/7889; F16C 2208/12; F16C 33/805; F16C 33/7896; F16C 33/7859; F16C 35/067; F16C 35/042; F16C 43/045; F16C 34/3464; F16C 33/7846;
(Continued)

(56) References Cited

U.S. PATENT DOCUMENTS 3,233,678 A * 2/1966 Wilk .................. B63H 23/34
416/241 A
4,054,334 A * 10/1977 McAllister ............ F16C 43/045
277/402
(Continued)

FOREIGN PATENT DOCUMENTS

CA       2766928 C  * 11/2015 ............ F16C 13/006
DE  102013222622 A1 *  5/2015 ............ F16C 35/045
(Continued)

*Primary Examiner* — Marcus Charles
(74) *Attorney, Agent, or Firm* — Volpe and Koenig, P.C.

(57) ABSTRACT

An integrated plastic shield bearing assembly including a plastic shield for preventing contamination of running surfaces of a bearing assembly is disclosed. The integrated plastic shield bearing assembly includes an inner bearing ring defining an inner race, an outer bearing ring defining an outer race, and a plurality of rolling elements supported between the inner race and the outer race. A first one of the inner bearing ring or the outer bearing ring includes a circumferential groove. The plastic shield includes a molding portion molded on to the circumferential groove of the first one of the inner bearing ring or the outer bearing ring, and a shield portion extending towards a second one of the inner bearing ring or the outer bearing ring.

18 Claims, 14 Drawing Sheets

(58) Field of Classification Search
CPC ............... F16C 33/7869; F16H 15/3268; F16J 15/3268; F16J 15/3464
USPC ....... 384/151, 480, 477, 488–489, 536, 582, 384/588; 277/411, 540, 562, 575, 944; 474/144
See application file for complete search history.

(56) References Cited

U.S. PATENT DOCUMENTS

| | | | | |
|---|---|---|---|---|
| 4,384,387 A | * | 5/1983 | Pachuta | B65G 39/09 105/150 |
| 4,639,149 A | * | 1/1987 | Bras | F16C 33/7859 277/351 |
| 5,419,641 A | * | 5/1995 | Fujinami | F16C 19/466 384/470 |
| 5,433,533 A | * | 7/1995 | Imazaike | F16C 33/7846 384/488 |
| 6,142,675 A | * | 11/2000 | Brandenstein | B29C 45/14491 384/537 |
| 6,774,518 B2 | * | 8/2004 | Howe | H02K 5/08 310/89 |
| 7,201,685 B2 | * | 4/2007 | Terada | F16C 33/7853 384/486 |
| 7,448,807 B2 | * | 11/2008 | Schenk | F16C 13/006 384/417 |
| 7,811,004 B2 | * | 10/2010 | Dorner | B25F 5/02 384/477 |
| 8,297,949 B1 | * | 10/2012 | Mancl | F04D 17/164 417/423.11 |
| 8,864,385 B2 | * | 10/2014 | Varnoux | F16C 33/7859 384/478 |
| 2002/0015543 A1 | * | 2/2002 | Pairone | F16C 33/785 384/477 |
| 2004/0175065 A1 | * | 9/2004 | Nguyen | F16C 33/80 384/480 |
| 2009/0214145 A1 | * | 8/2009 | Cislo | F16C 35/04 384/208 |
| 2010/0284642 A1 | * | 11/2010 | Mineno | F16C 35/067 384/569 |
| 2016/0348727 A1 | | 12/2016 | Shaikh et al. | |

FOREIGN PATENT DOCUMENTS

| | | | | | |
|---|---|---|---|---|---|
| GB | | 635790 A | * | 4/1950 | .......... F16C 33/7873 |
| JP | | 08177870 A | * | 7/1996 | .............. F16C 33/62 |
| JP | | 11101251 A | * | 4/1999 | |
| JP | | 2003004124 A | * | 1/2003 | ............. F16H 55/78 |
| WO | WO-2009129435 A1 | * | 10/2009 | ............. A61C 1/181 | |

* cited by examiner

INTEGRATED PLASTIC SHIELD BEARING ASSEMBLY

CROSS REFERENCE TO RELATED APPLICATION

This application claims the benefit of U.S. Provisional Application 62/277,685, filed Jan. 12, 2016, which is incorporated by reference as if fully set forth.

FIELD OF INVENTION

The present invention relates to a bearing assembly and is more particularly related to a shield for a bearing assembly.

BACKGROUND

Bearing assemblies are used in a wide range of applications. One type of bearing assembly is used for supporting an intermediate drive shaft. The intermediate drive shaft is typically supported by a bearing assembly, and the bearing assembly is supported on an outer housing that can be mounted to the engine block.

During operation, debris can accumulate in the region of the bearing assembly supporting the intermediate drive shaft. This accumulation of debris increases friction between the bearing surfaces and reduces the efficiency of the bearing assembly. Existing solutions to reduce the ingress of debris include providing a shield that must be separately mounted to the outer housing. These known shield configurations require additional space and additional assembly steps.

It would be desirable to provide a shield for a bearing assembly supporting an intermediate drive shaft that is both compact and easy to assemble.

SUMMARY

A compact, integrated plastic shield bearing assembly for an intermediate drive shaft is disclosed. The integrated plastic shield bearing assembly includes an inner bearing ring defining an inner race, an outer bearing ring defining an outer race, and a plurality of rolling elements supported between the inner race and the outer race. A first one of the inner bearing ring or the outer bearing ring includes a circumferential groove. A plastic shield includes a molding portion molded on to the circumferential groove of the first one of the inner bearing ring or the outer bearing ring, and a shield portion extending towards a second one of the inner bearing ring or the outer bearing ring.

Additional preferred arrangements of the bearing with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 1A:
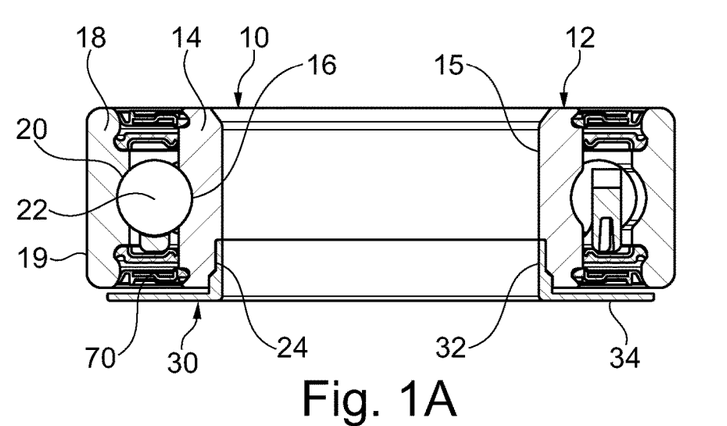
FIG. 1A is a cross-sectional view of an integrated plastic shield bearing assembly according to a first embodiment.
Figure 1B:
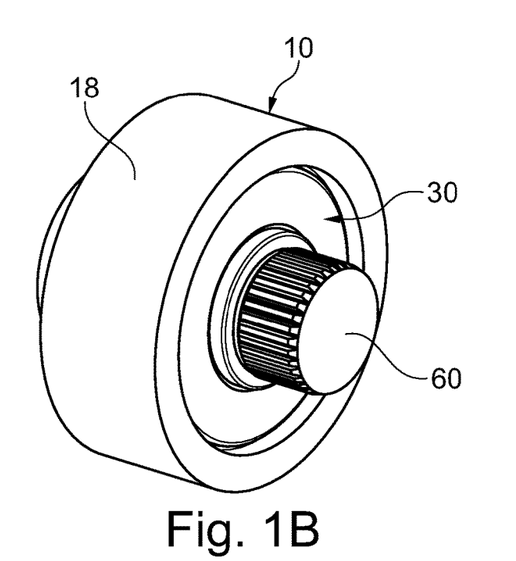
FIG. 1B is a perspective view of the integrated plastic shield bearing assembly of FIG. 1A.

A first embodiment of an integrated plastic shield bearing assembly 10 is shown in FIGS. 1A and 1B. The integrated plastic shield bearing assembly 10 includes a bearing assembly 12 having an inner bearing ring 14 defining an inner race 16, an outer bearing ring 18 defining an outer race 20, and a plurality of rolling elements 22 supported between the inner race 16 and the outer race 20. The outer bearing ring 18 defines a radially outer surface 19. A first one of the inner bearing ring 14 or the outer bearing ring 18 includes a circumferential groove 24. In the first embodiment, the inner bearing ring 14 includes the circumferential groove 24. As shown in FIG. 1B, the bearing assembly 12 supports a shaft 60. The shaft 60 is preferably an intermediate drive shaft that can be supported, for example, on an engine (not shown).

Figure 1C:
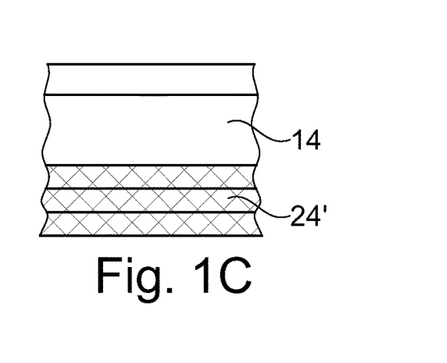
FIG. 1C is a cross-sectional view of a portion of an alternative inner bearing ring of the integrated plastic shield bearing assembly of FIGS. 1A and 1B.

A plastic shield 30 is provided that includes a molding portion 32 molded on to the circumferential groove 24 of the first one of the inner bearing ring 14 or the outer bearing ring 18. In the first embodiment, the circumferential groove 24 includes a smooth profile. Alternatively, the circumferential groove 24 on the inner bearing ring 14 includes a knurled profile 24' (shown in FIG. 1C), toothed profile, or roughened surface. A shield portion 34 of the plastic shield 30 extends towards a second one of the inner bearing ring 14 or the outer bearing ring 18, and in the case of the first embodiment, towards the outer bearing ring 18. The shield portion 34 prevents the ingress of contaminants to the bearing assembly 12. As shown in FIGS. 1A and 1B, the inner bearing ring 14 includes the circumferential groove 24 on a radially inner surface 15 and the shield portion 34 extends towards the outer bearing ring 18. The shield portion 34 extends radially outwardly and is at least partially aligned in an axial plane with the outer bearing ring 18. The plastic shield 30 acts as a "dynamic" flinger because debris that contacts the shield 30 is flung radially outward by the plastic shield 30 due to centrifugal force during rotation of the shaft 60. As shown in FIG. 1A, in-board seals 70 are also provided that provide additional protection for the bearing assembly 12 from the ingress of debris.

Figure 2A:
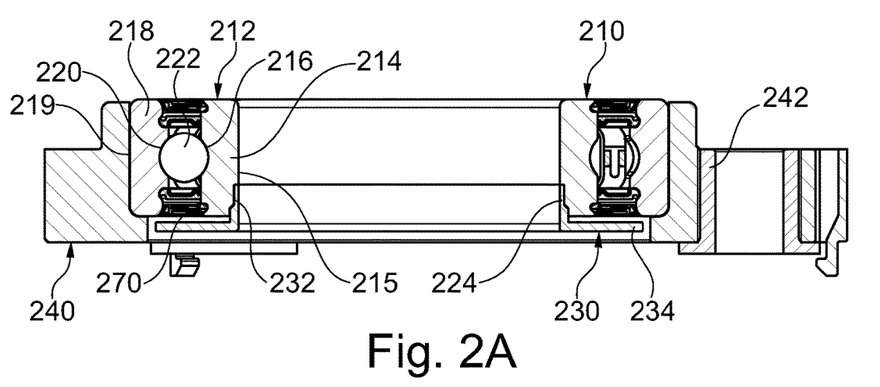
FIG. 2A is a cross-sectional view of an integrated plastic shield bearing assembly according to a second embodiment.
Figure 2B:
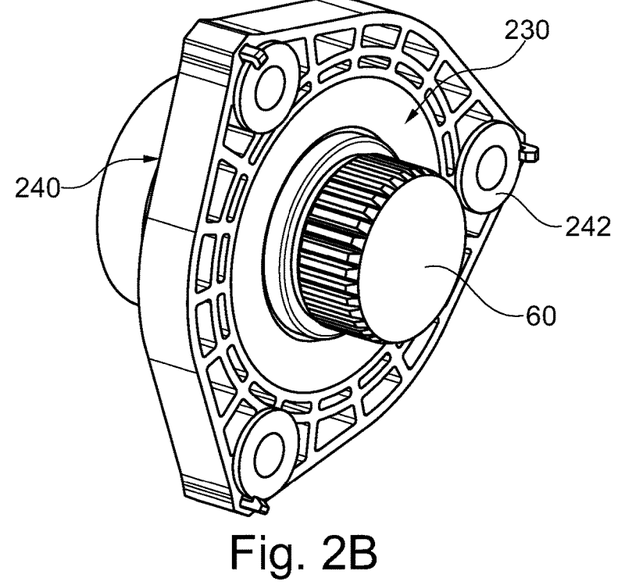
FIG. 2B is a perspective view of the integrated plastic shield bearing assembly of FIG. 2A.

A second embodiment of an integrated plastic shield bearing assembly 210 is shown in FIGS. 2A and 2B. The integrated plastic shield bearing assembly 210 of the second embodiment is the same as the first embodiment with the bearing assembly 212, inner bearing ring 214, radially inner surface 215, inner race 216, outer bearing ring 218, radially outer surface 219, outer race 220, circumferential groove 224, rolling elements 222, plastic shield 230, molding portion 232, shielding portion 234, and seals 270 corresponding to the similar element numbers above. Here, the outer bearing ring 218 is supported on a plastic housing 240. The plastic housing 240 includes mounting openings 242 for mounting the plastic housing 240 to an engine block (not shown). As shown in FIG. 2A, clearance is provided between the plastic housing 240 and the plastic shield 230. The plastic shield 230 and the plastic housing 240 are positioned such that the clearance between these two components is minimized to reduce debris from entering the bearing assembly 212 and contaminating the running surfaces thereby reducing the efficiency of the bearing assembly 212.

Figure 3A:
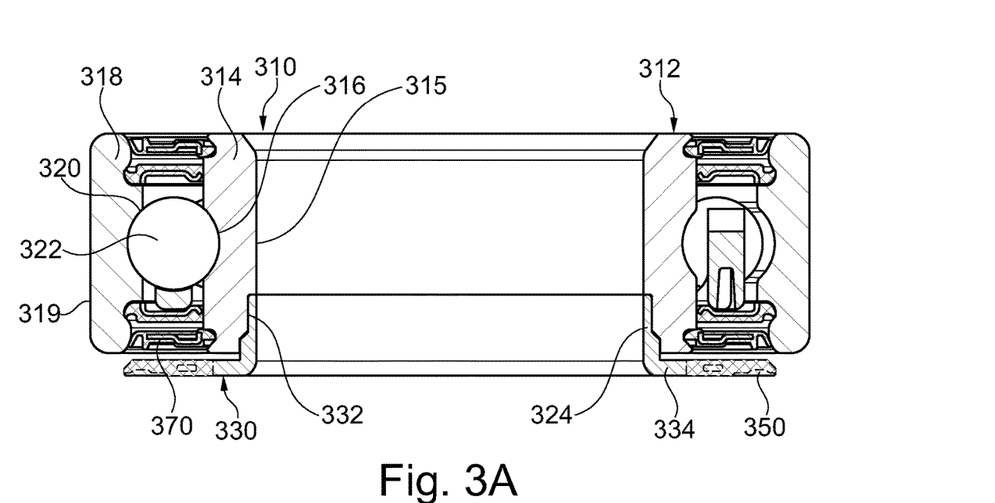
FIG. 3A is a cross-sectional view of an integrated plastic shield bearing assembly according to a third embodiment.
Figure 3B:
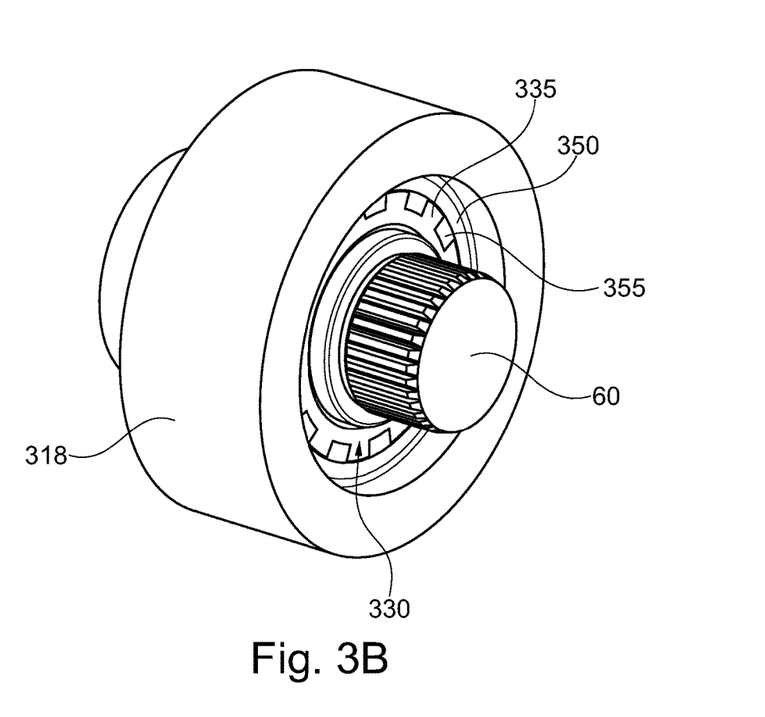
FIG. 3B is a perspective view of the integrated plastic shield bearing assembly of FIG. 3A.

A third embodiment of an integrated plastic shield bearing assembly 310 is shown in FIGS. 3A and 3B. The integrated plastic shield bearing assembly 310 of the third embodiment is the same as the first embodiment with the bearing assembly 312, inner bearing ring 314, radially inner surface 315, inner race 316, outer bearing ring 318, radially outer surface 319, outer race 320, circumferential groove 324, rolling elements 322, plastic shield 330, molding portion 332, shielding portion 334, and seals 370 corresponding to the similar element numbers above. In this embodiment, the plastic shield 330 includes an elastomeric seal 350 that is integrally formed with the plastic shield 330. The elastomeric seal 350 is preferably integrally formed with the plastic shield 330 via multi-shot molding. One of ordinary skill will recognize from the present disclosure that alternative molding formation processes could be used. The elastomeric seal 350 is preferably comprised of a thermoplastic elastomer, and is more preferably comprised of thermoplastic polyurethane. One of ordinary skill in the art will recognize from the present application that alternative materials could be used for the elastomeric seal 350.

As shown in FIG. 3B, the plastic shield 330 includes a first interlocking element 335 and the elastomeric seal 350 includes a second interlocking element 335. The first interlocking element 335 and the second interlocking element 355 positively engage with one another during the formation process to aid in holding these parts together. As shown in FIG. 3B, the first interlocking element 335 and the second interlocking element 355 preferably each comprise a plurality teeth. One of ordinary skill in the art will recognize from the present application that alternative configurations of interlocking elements could be used. As shown in FIG. 3B, the first interlocking element 335 is formed on a radially outer surface of the plastic shield 330, and the second interlocking element 355 is formed on a radially inner surface of the elastomeric seal 350. One of ordinary skill in the art will recognize from the present application that alternative configurations of the interlocking elements can be used, for example as shown in the fourth, eighth, and ninth embodiments described below.

Figure 4A:
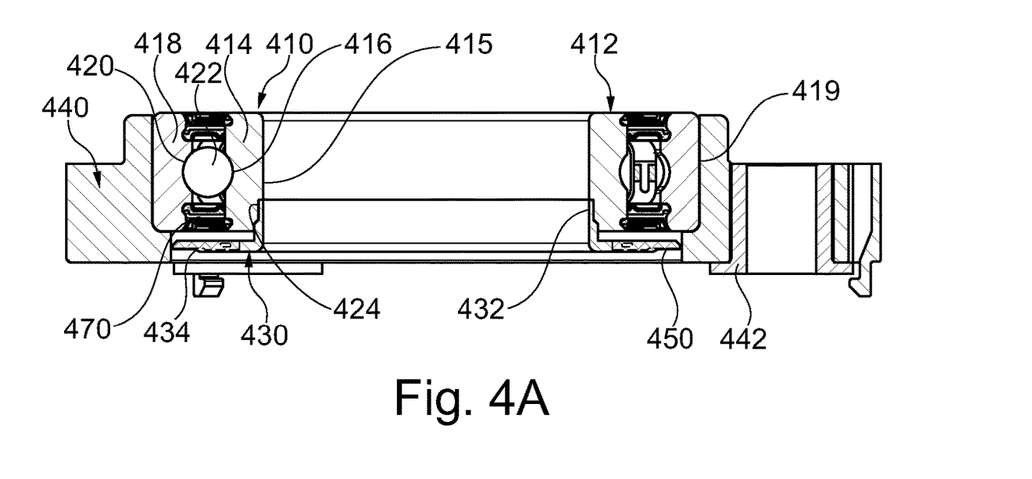
FIG. 4A is a cross-sectional view of an integrated plastic shield bearing assembly according to a fourth embodiment.
Figure 4B:
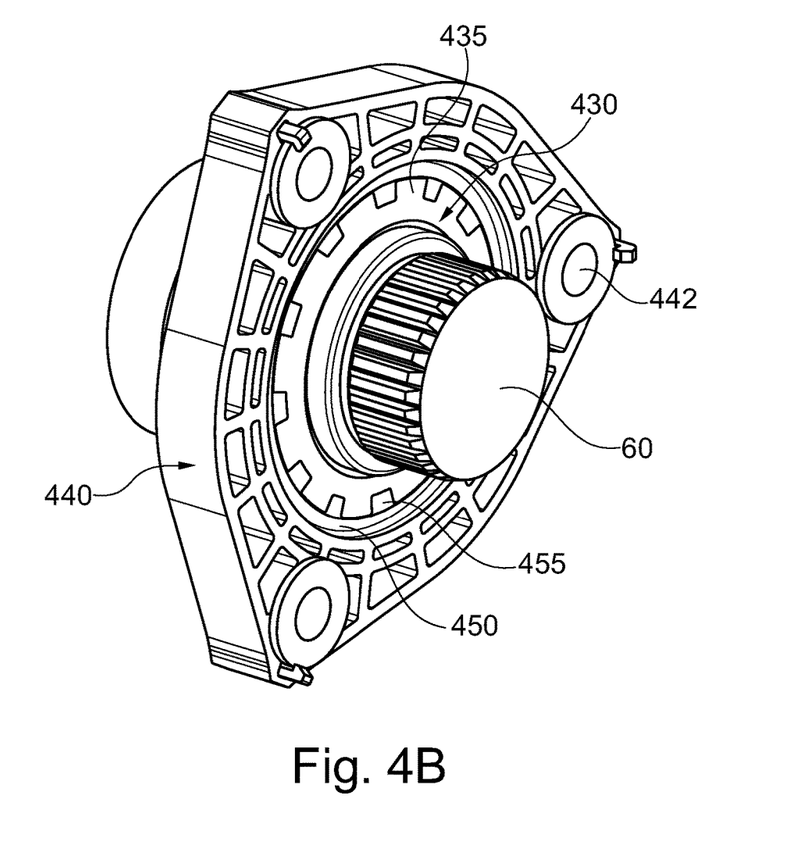
FIG. 4B is a perspective view of the integrated plastic shield bearing assembly of FIG. 4A.

A fourth embodiment of an integrated plastic shield bearing assembly 410 is shown in FIGS. 4A and 4B. The integrated plastic shield bearing assembly 410 of the fourth embodiment is the same as the third embodiment with the bearing assembly 412, inner bearing ring 414, radially inner surface 415, inner race 416, outer bearing ring 418, radially outer surface 419, outer race 420, circumferential groove 424, rolling elements 422, plastic shield 430, molding portion 432, shielding portion 434, and seals 470 correspond to the similar element numbers above. In this embodiment, the integrated plastic shield bearing assembly 410 also includes a plastic housing 440. Here, the outer bearing ring 418 is supported on the plastic housing 440 and the elastomeric seal 450 contacts the plastic housing 440. The plastic housing 440 of the fourth embodiment is identical to the plastic housing 240 described above with respect to the second embodiment, and includes the mounting openings 442.

Figure 5A:
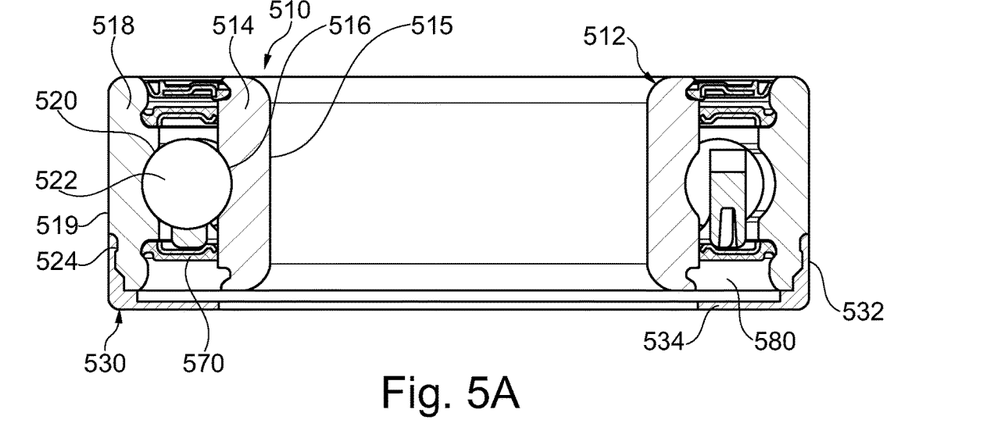
FIG. 5A is a cross-sectional view of an integrated plastic shield bearing assembly according to a fifth embodiment.
Figure 5B:
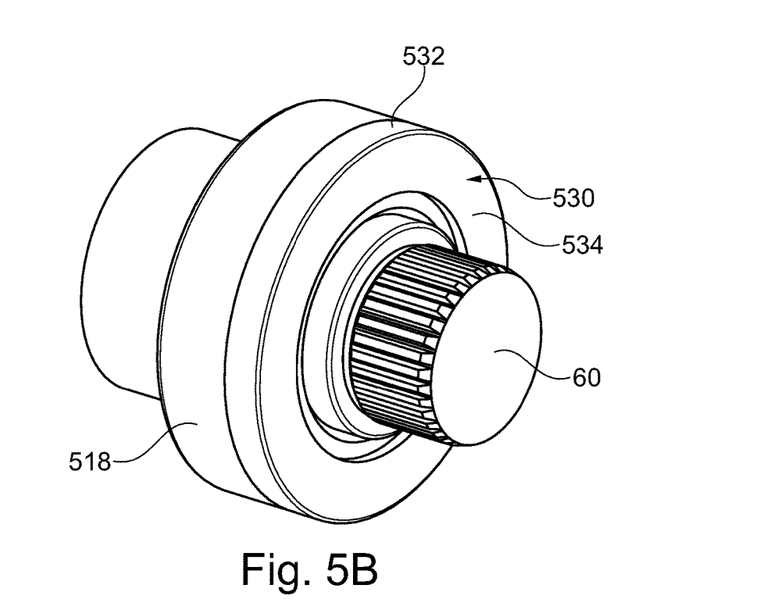
FIG. 5B is a perspective view of the integrated plastic shield bearing assembly of FIG. 5A.

A fifth embodiment of an integrated plastic shield bearing assembly 510 is shown in FIGS. 5A and 5B. The integrated plastic shield bearing assembly 510 of the fifth embodiment is similar to the first embodiment with the bearing assembly 512, inner bearing ring 514, radially inner surface 515, inner race 516, outer bearing ring 518, radially outer surface 519, outer race 520, circumferential groove 524, rolling elements 522, plastic shield 530, molding portion 532, shielding portion 534, and seals 570 corresponding to the similar element numbers above. However, in this embodiment, the plastic shield 530 is molded on to the outer bearing ring 518 instead of the inner bearing ring 514. As shown in FIG. 5A, the outer bearing ring 518 includes a circumferential groove 524 on a radially outer surface 519 of the outer bearing ring 518, and the plastic shield 530 is molded on to the circumferential groove 524 of the outer bearing ring 514. As shown in FIG. 5B, clearance is provided between the shaft 60 and the plastic shield 530. The clearance is minimized between the plastic shield 530 and the shaft 60 to reduce the size of the entry point for debris entering the bearing assembly 512 and contaminating the running surfaces. A lubricant reservoir 580 is provided in the space defined between the rings 514, 518, the in-board seal 570, and the plastic shield 530, and the lubricant reservoir 580 can intermittently provide lubricant to the raceways of the bearing assembly 512. The in-board seal 570 is configured to periodically allow lubricant to seep from the lubricant reservoir 580 to the raceways of the bearing assembly 512.

Figure 6A:
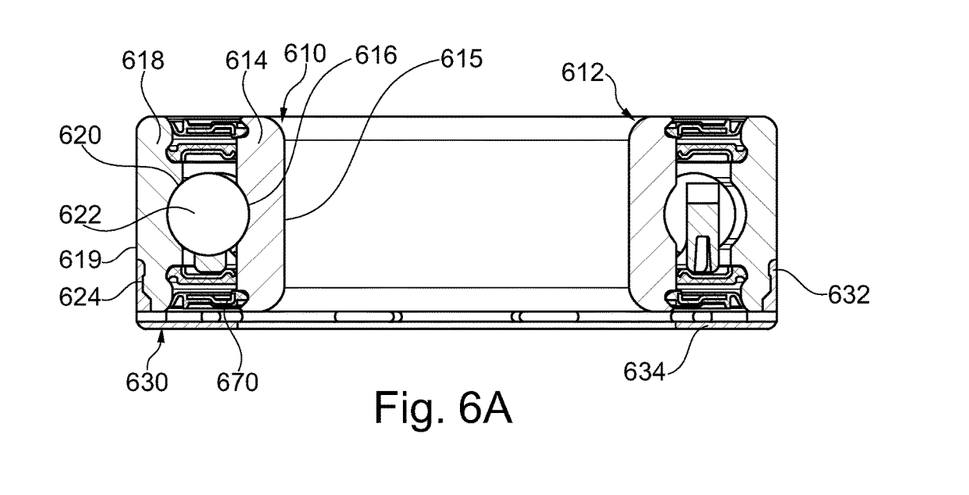
FIG. 6A is a cross-sectional view of an integrated plastic shield bearing assembly according to a sixth embodiment.
Figure 6B:
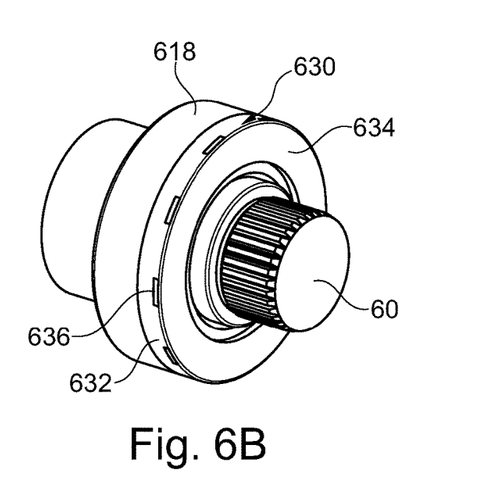
FIG. 6B is a perspective view of the integrated plastic shield bearing assembly of FIG. 6A.
Figure 6C:
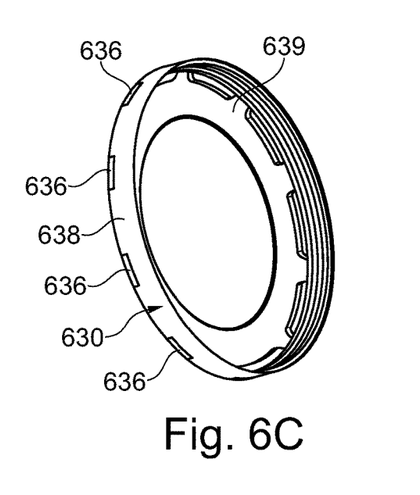
FIG. 6C is a perspective view of the plastic shield of the integrated plastic shield bearing assembly of FIGS. 6A and 6B.
Figure 7A:
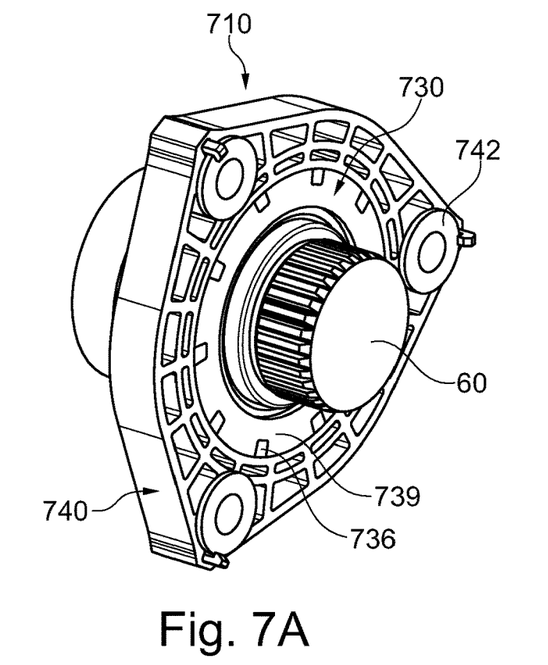
FIG. 7A is a perspective view of an integrated plastic shield bearing assembly according to a seventh embodiment.
Figure 7B:
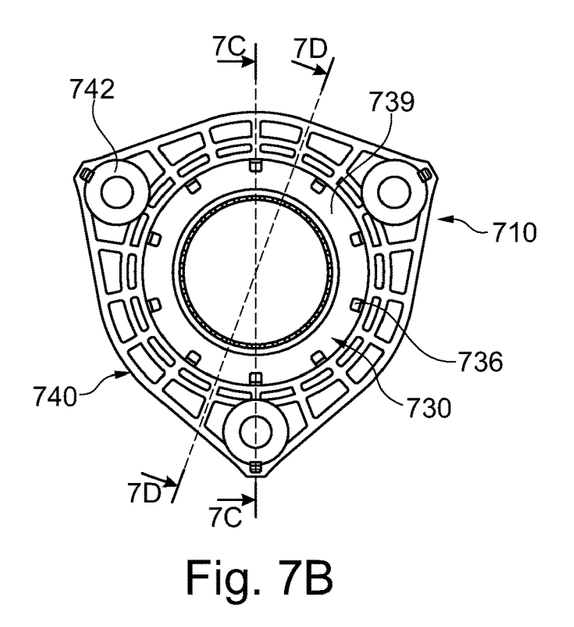
FIG. 7B is a front view of the integrated plastic shield bearing assembly of FIG. 7A.
Figure 7C:
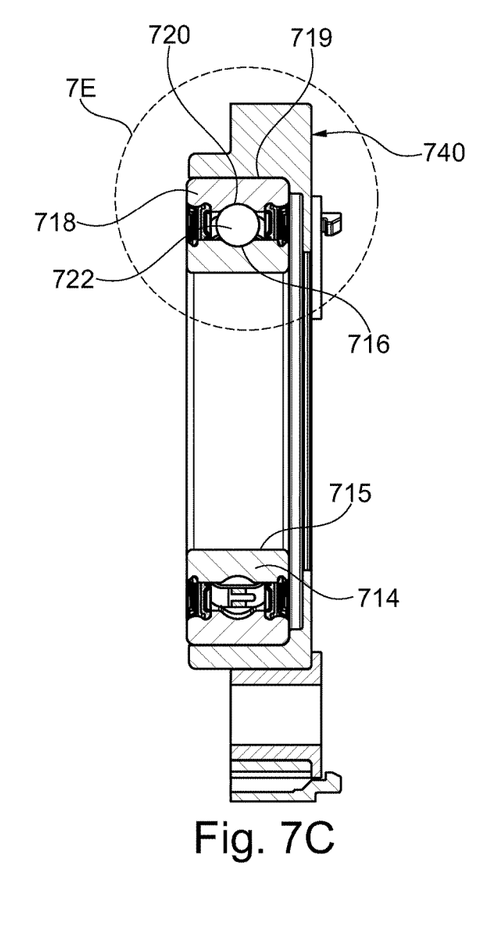
FIG. 7C is a cross-sectional view of the integrated plastic shield bearing assembly of FIG. 7B along line 7C in FIG. 7B.
Figure 7D:
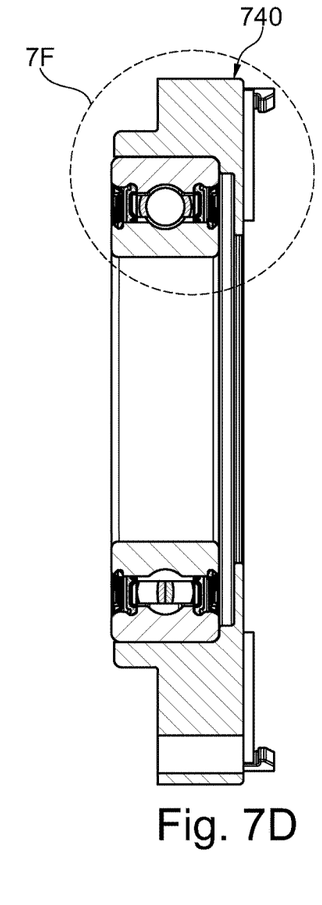
FIG. 7D is a cross-sectional view of the integrated plastic shield bearing assembly of FIG. 7B along line 7D in FIG. 7B.
Figure 7E:
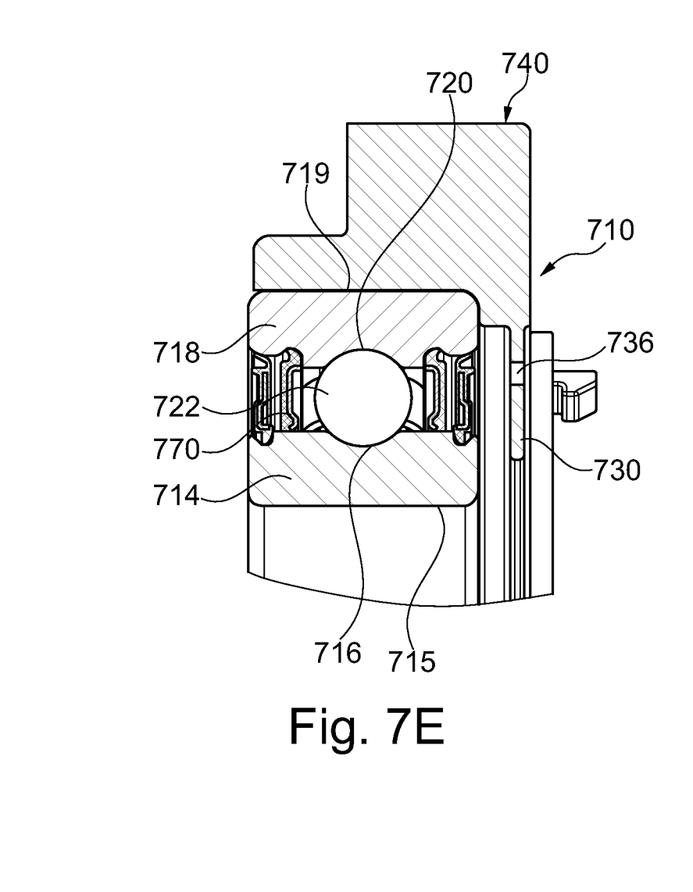
FIG. 7E is a magnified cross-sectional view of a region encircled by circle 7E from FIG. 7C.
Figure 7F:
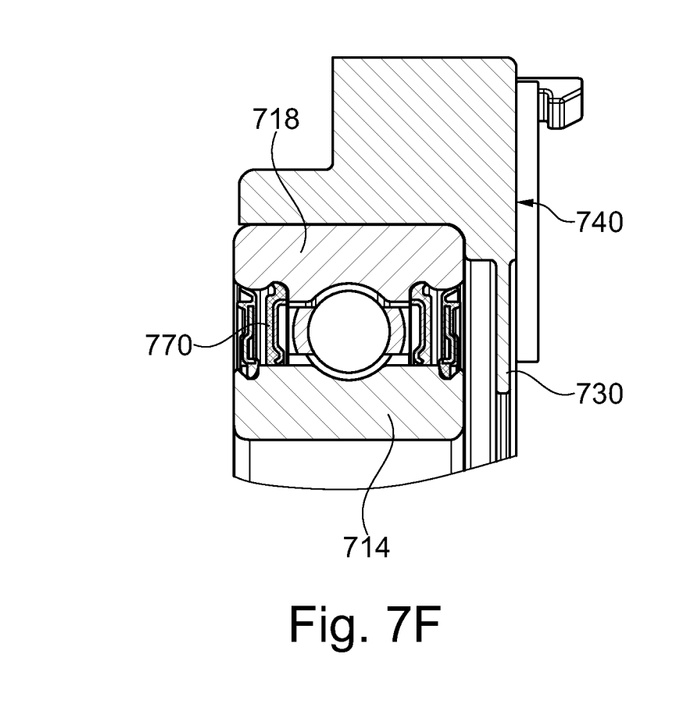
FIG. 7F is a magnified cross-sectional view of a region encircled by circle 7F from FIG. 7D.

A sixth embodiment of an integrated plastic shield bearing assembly 610 is shown in FIGS. 6A, 6B, and 6C. The integrated plastic shield bearing assembly 610 of the sixth embodiment is similar to the fifth embodiment with the bearing assembly 612, inner bearing ring 614, radially inner surface 615, inner race 616, outer bearing ring 618, radially outer surface 619, outer race 620, circumferential groove 624, rolling elements 622, plastic shield 630, molding portion 632, shielding portion 634, and seals 670 corresponding to the similar element numbers above. However, in the sixth embodiment, the plastic shield 630 includes drainage slots 636 located around a periphery of the plastic shield 630. During rotation of the intermediate drive shaft 60, debris and liquids can accumulate in the space between the plastic shield 630 and the bearing assembly 612. Accumulation of debris and liquids in this space is undesirable due to the potential contamination of the running surfaces of the bearing assembly 612, thereby reducing the efficiency of the bearing assembly 612. The drainage slots 636 allow debris and liquids to drain from the integrated plastic shield bearing assembly 610 by being flung radially outwardly by centrifugal force. As shown in FIGS. 6A, 6B, and 6C, a plurality of drainage slots 636 are located around a periphery of the plastic shield 630 on a radially outer surface 638 and an axial end face 639 of the plastic shield 630. One of ordinary skill in the art will recognize from the present application that alternative configurations of the drainage slots 636 could be used, for example as shown in FIGS. 7A-7F.

A seventh embodiment of an integrated plastic shield bearing assembly 710 is shown in FIGS. 7A-7F. The integrated plastic shield bearing assembly 710 of the seventh embodiment is similar to the sixth embodiment with the inner bearing ring 714, radially inner surface 715, inner race 716, outer bearing ring 718, radially outer surface 719, outer race 720, rolling elements 722, plastic shield 730, and seals 770 corresponding to the similar element numbers above. Here, the outer bearing ring 718 of the integrated plastic shield bearing assembly 710 is supported on a plastic housing 740. In this embodiment, the drainage slots 736 are only provided on an axial end face 739 of the plastic shield 730. The drainage slots 736 are not on the radially outer surface of the plastic shield 730 (as shown in the sixth embodiment) because the plastic housing 740 would block any debris or liquids from draining radially outwardly. In this embodiment, the plastic shield 730 is integrally formed with the plastic housing 740.

Figure 8A:
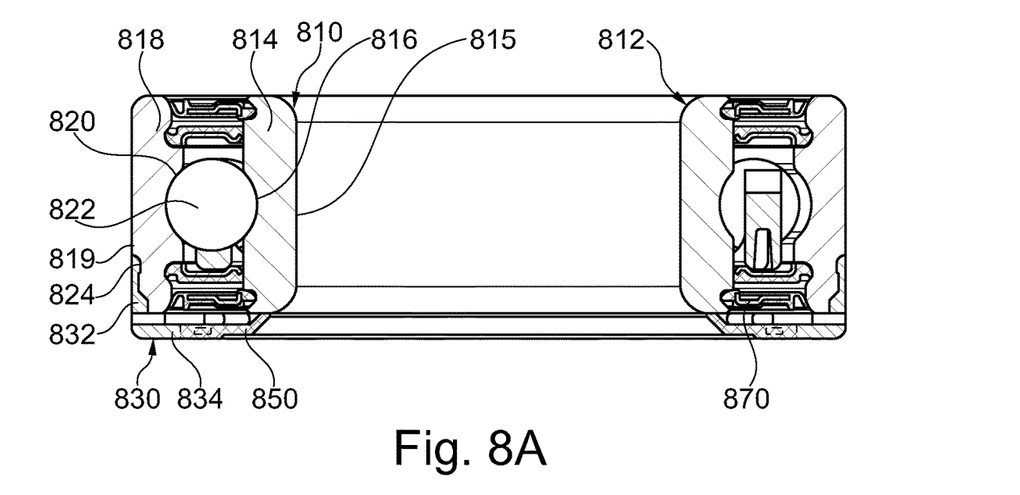
FIG. 8A is a cross-sectional view of an integrated plastic shield bearing assembly according to an eighth embodiment.
Figure 8B:
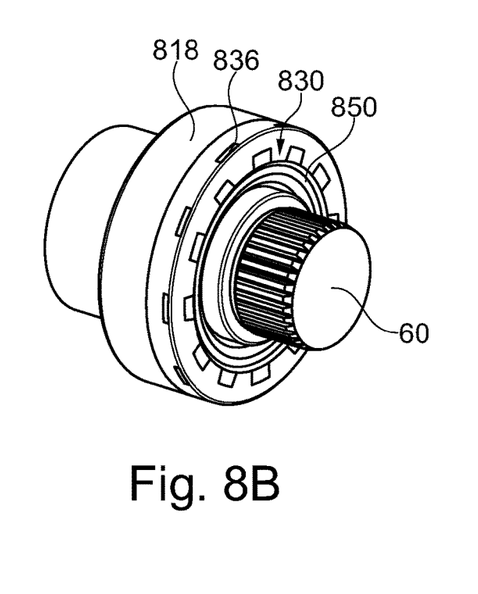
FIG. 8B is a perspective view of the integrated plastic shield bearing assembly of FIG. 8A.
Figure 8C:
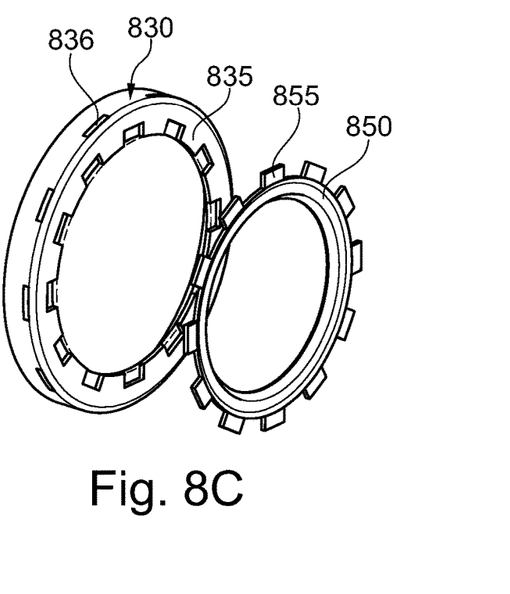
FIG. 8C is a perspective view of the plastic shield of the integrated plastic shield bearing assembly of FIGS. 8A and 8B.
Figure 9A:
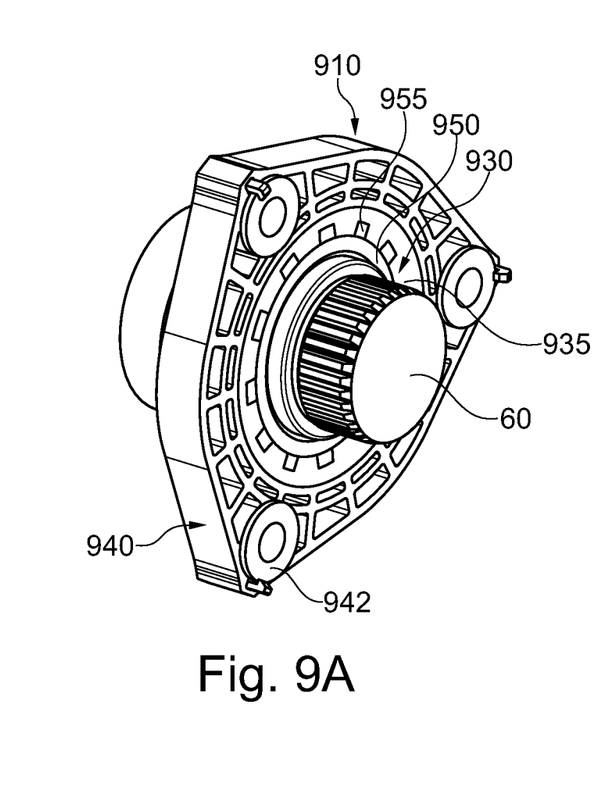
FIG. 9A is a perspective view of an integrated plastic shield bearing assembly according to a ninth embodiment.
Figure 9B:
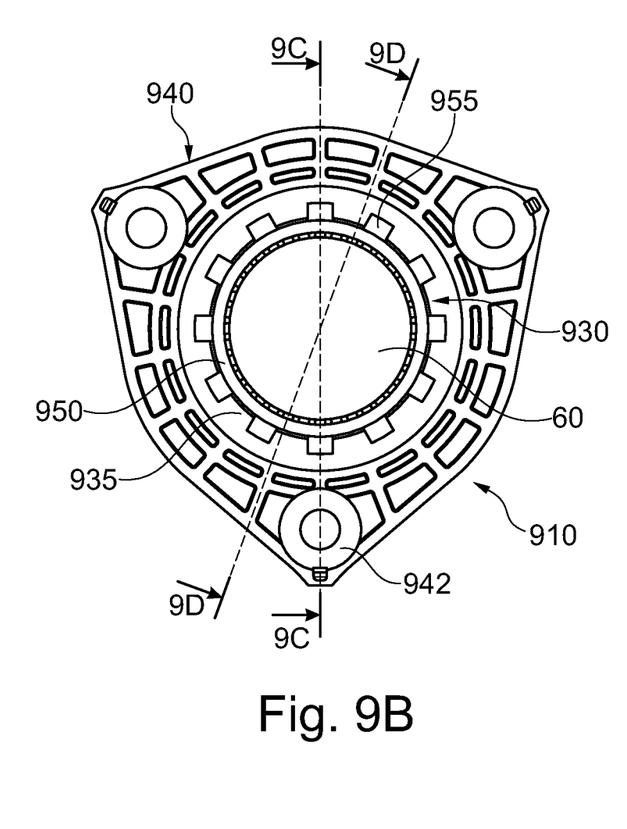
FIG. 9B is a front view of the integrated plastic shield bearing assembly of FIG. 9A.
Figure 9C:
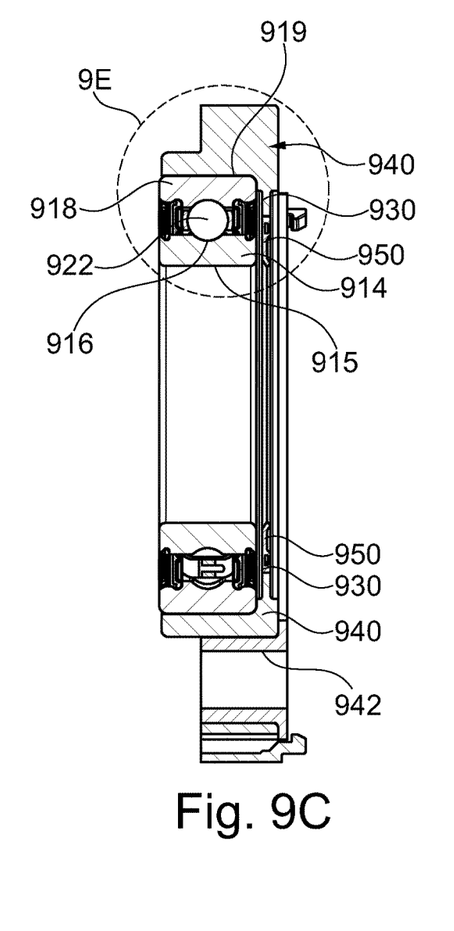
FIG. 9C is a cross-sectional view of the integrated plastic shield bearing assembly of FIG. 9B along line 9C in FIG. 9B.
Figure 9D:
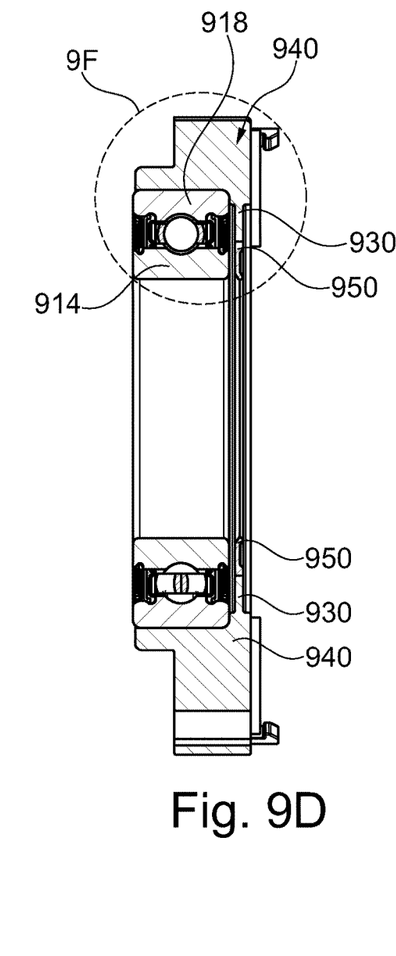
FIG. 9D is a cross-sectional view of the integrated plastic shield bearing assembly of FIG. 9B along line 9D in FIG. 9B.
Figure 9E:
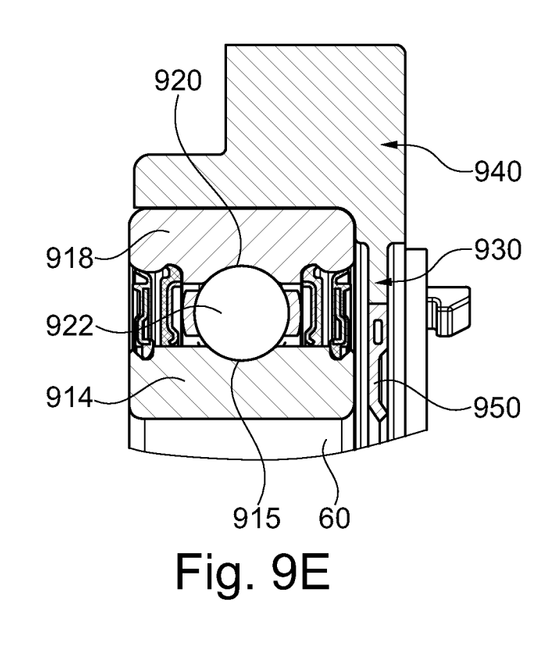
FIG. 9E is a magnified cross-sectional view of a region encircled by circle 9E from FIG. 9C.
Figure 9F:
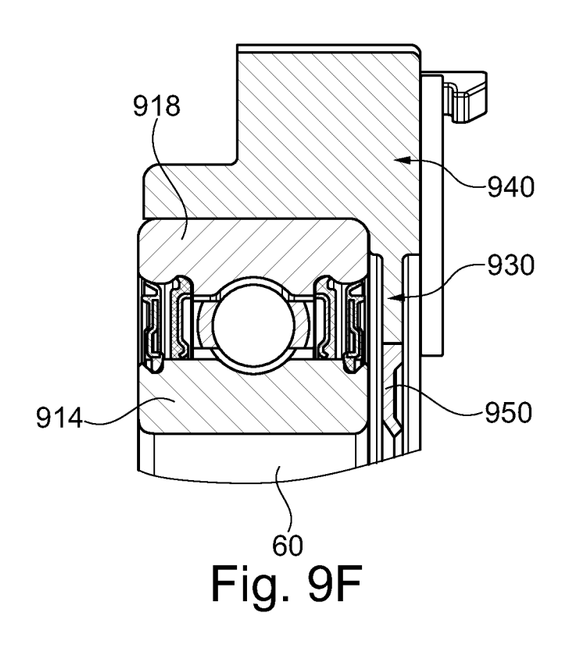
FIG. 9F is a magnified cross-sectional view of a region encircled by circle 9F from FIG. 9D.

An eighth embodiment of an integrated plastic shield bearing assembly 810 is shown in FIGS. 8A and 8B. The integrated plastic shield bearing assembly 810 of the eighth embodiment is similar to the seventh embodiment with the bearing assembly 812, inner bearing ring 814, radially inner surface 815, inner race 816, outer bearing ring 818, radially outer surface 819, outer race 820, circumferential groove 824, rolling elements 822, plastic shield 830, molding portion 832, shielding portion 834, and seals 870 corresponding to the similar element numbers above. However, in the eighth embodiment, the plastic shield 830 includes an elastomeric seal 850, which is similar to the elastomeric seal 350, 450 of the third and fourth embodiments. The plastic shield 830 includes the first interlocking elements 835 on a radially inner surface, and the elastomeric seal 850 includes the second interlocking elements 855 on a radially outer surface. The plastic shield 830 and the elastomeric seal 850 are integrally formed as discussed above regarding the third embodiment. As shown in FIG. 8A, the elastomeric seal 850 contacts the inner bearing ring 814 and prevents debris and contaminants from entering the bearing assembly 812.

A ninth embodiment of an integrated plastic shield bearing assembly 910 is shown in FIGS. 9A-9F. The integrated plastic shield bearing assembly 910 of the ninth embodiment is similar to the eighth embodiment with the inner bearing ring 914, radially inner surface 915, inner race 916, outer bearing ring 918, radially outer surface 919, outer race 920, rolling elements 922, plastic shield 930, and seals 970 corresponding to the similar element numbers above. Here, the outer bearing ring 918 is supported on the plastic housing 940, and the elastomeric seal 950 contacts the shaft 60 instead of the inner bearing ring 914.

Figure 10:
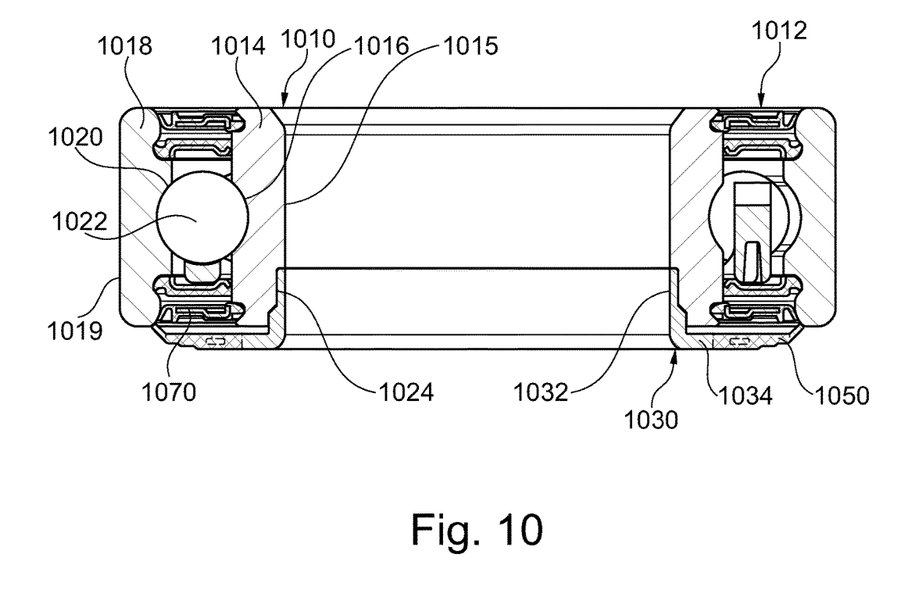
FIG. 10 is a cross-sectional view of an integrated plastic shield bearing assembly according to a tenth embodiment.

A tenth embodiment of an integrated plastic bearing assembly 1010 is shown in FIG. 10. The integrated plastic shield bearing assembly 1010 of the tenth embodiment is similar to the third embodiment of the plastic shield bearing assembly 310, with the bearing assembly 1012, inner bearing ring 1014, radially inner surface 1015, inner race 1016, outer bearing ring 1018, radially outer surface 1019, outer race 1020, circumferential groove 1024, rolling elements 1022, plastic shield 1030, molding portion 1032, shielding portion 1034, and seals 1070 corresponding to the similar element numbers above. However, here, the elastomeric seal 1050 contacts the outer bearing ring 1018.

Having thus described various embodiments of the present bearing arrangement in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An integrated plastic shield bearing assembly comprising:
   an inner bearing ring defining an inner race;
   an outer bearing ring defining an outer race;
   a plurality of rolling elements supported between the inner race and the outer race, the inner bearing ring includes a circumferential groove, and the circumferential groove is formed on a radially inner surface of the inner bearing ring; and
   a plastic shield including a molding portion molded on to the circumferential groove of the inner bearing ring, and a shield portion extending towards the outer bearing ring, and the shield portion of the plastic shield extends radially outwardly to overlap an axially outermost end surface of the outer bearing ring.

2. The integrated plastic shield bearing assembly of claim 1, wherein the circumferential groove has a knurled profile.

3. The integrated plastic shield bearing assembly of claim 1, further comprising a plastic outer housing supported on the outer bearing ring.

4. The integrated plastic shield bearing assembly of claim 1, further comprising an elastomeric seal integrally formed with the plastic shield.

5. The integrated plastic shield bearing assembly of claim 4, wherein the elastomeric seal is integrally formed with the plastic shield via multi-shot molding.

6. The integrated plastic shield bearing assembly of claim 4, further comprising a plastic outer housing supported on the outer bearing ring, and the elastomeric seal contacts the plastic outer housing.

7. The integrated plastic shield bearing assembly of claim 4, wherein the elastomeric seal contacts the outer bearing ring.

8. The integrated plastic shield bearing assembly of claim 4, wherein the elastomeric seal contacts the inner bearing ring.

9. The integrated plastic shield bearing assembly of claim 4, further comprising a shaft supported by the inner bearing ring, and the elastomeric seal contacts the shaft.

10. The integrated plastic shield bearing assembly of claim 4, wherein the elastomeric seal is comprised of a thermoplastic elastomer.

11. The integrated plastic shield bearing assembly of claim 10, wherein the thermoplastic elastomer is thermoplastic polyurethane.

12. The integrated plastic shield bearing assembly of claim 4, wherein the plastic shield includes a first interlocking element, the elastomeric seal includes a second interlocking element, and the first interlocking element and the second interlocking element engage with one another.

13. The integrated plastic shield bearing assembly of claim 12, wherein the first interlocking element is formed on a radially inner surface of the plastic shield, and the second interlocking element is formed on a radially outer surface of the elastomeric seal.

14. The integrated plastic shield bearing assembly of claim 12, wherein the first interlocking element is formed on a radially outer surface of the plastic shield, and the second interlocking element is formed on a radially inner surface of the elastomeric seal.

15. The integrated plastic shield bearing assembly of claim 1, wherein the plastic shield includes a drainage slot on at least a radially outer surface or an axial end face of the plastic shield.

16. An intermediate drive shaft assembly, including an intermediate drive shaft and the integrated plastic shield bearing assembly of claim 1, wherein the intermediate drive shaft is supported by the inner bearing ring.

17. An integrated plastic shield bearing assembly comprising:
an inner bearing ring defining an inner race;
an outer bearing ring defining an outer race;
a plurality of rolling elements supported between the inner race and the outer race, the inner bearing ring includes a circumferential groove, and the circumferential groove is formed on a radially inner surface of the inner bearing ring;
a plastic outer housing supported on the outer bearing ring; and
a plastic shield including a molding portion molded on to the circumferential groove of the inner bearing ring, and a shield portion extending towards the outer bearing ring, and the shield portion of the plastic shield extends radially outwardly to overlap an axially outermost end surface of the outer bearing ring.

18. The integrated plastic shield bearing assembly of claim 1, wherein a radially innermost surface of the plastic shield and a radially innermost surface of the inner bearing ring are aligned with each other.

* * * * *